(12) United States Patent
Budhu

(10) Patent No.: US 7,210,718 B1
(45) Date of Patent: May 1, 2007

(54) APPARATUS FOR PROTECTING THE EXTERIOR OF A VEHICLE

(76) Inventor: Alan Budhu, 80 Tuers Ave., Jersey City, NJ (US) 07306

( * ) Notice: Subject to any disclaimer, the term of this patent is extended or adjusted under 35 U.S.C. 154(b) by 0 days.

(21) Appl. No.: 11/249,914

(22) Filed: Oct. 14, 2005

(51) Int. Cl.
*B60R 19/48* (2006.01)

(52) U.S. Cl. ..................................... 293/114
(58) Field of Classification Search ............... 293/114, 293/118, 119
See application file for complete search history.

(56) References Cited

U.S. PATENT DOCUMENTS

| | | | | |
|---|---|---|---|---|
| 3,236,552 A | * | 2/1966 | Percifull | 293/9 |
| 3,338,181 A | * | 8/1967 | Dorrance | 104/178 |
| 3,677,595 A | * | 7/1972 | Hamilton | 293/118 |
| 3,934,912 A | * | 1/1976 | Ogihara et al. | 293/119 |
| 3,947,061 A | * | 3/1976 | Ellis | 293/5 |
| 4,116,482 A | * | 9/1978 | Spiegel | 296/180.3 |
| 4,216,839 A | * | 8/1980 | Gould et al. | 180/65.1 |
| 4,217,715 A | * | 8/1980 | Bryan, Jr. | 40/591 |
| 4,437,697 A | * | 3/1984 | Hinojos | 293/118 |
| 4,659,130 A | * | 4/1987 | Dimora et al. | 296/180.1 |
| 5,101,927 A | * | 4/1992 | Murtuza | 180/275 |
| 6,189,941 B1 | * | 2/2001 | Nohr | 293/118 |
| 6,302,458 B1 | * | 10/2001 | Wang et al. | 293/132 |
| 6,575,509 B1 | * | 6/2003 | Golden | 293/119 |
| 6,893,079 B1 | * | 5/2005 | Johnson et al. | 296/187.12 |
| 2004/0046403 A1 | * | 3/2004 | DePottey et al. | 293/118 |
| 2004/0189024 A1 | * | 9/2004 | Lindsey | 293/118 |
| 2005/0082851 A1 | * | 4/2005 | Nakanishi | 293/118 |

* cited by examiner

*Primary Examiner*—Lori L. Lyjak
(74) *Attorney, Agent, or Firm*—Thomas L. Adams

(57) ABSTRACT

A vehicle protection apparatus can protect a vehicle's exterior. The exterior can have an optional opening. A support attached to the vehicle can support a guard and allow it to move between (a) a retracted position that does not obtrude on the appearance of the vehicle's exterior, and (a) a deployed position in front of the vehicle's exterior and, when existing, in front of the opening in the exterior. The guard may be mounted on the support to translate linearly and in some cases angularly as well. In such cases the guard may be in an upright position when deployed, and in a non-upright position under the vehicle when retracted.

25 Claims, 3 Drawing Sheets

APPARATUS FOR PROTECTING THE EXTERIOR OF A VEHICLE

BACKGROUND OF THE INVENTION

1. Field of the Invention

The present invention relates to vehicle exterior protection devices, and in particular, to apparatus that is unobtrusive unless deployed.

2. Description of Related Art

One of the most common of life's frustrations is scratches and small dents occurring when a vehicle is parked, especially in a parking lot. Damage to a parked car is more likely since modern bumpers are relatively soft and protrude less. These softer bumpers often have a fine finish matching the rest of the vehicle's exterior, so that impacts to come the bumper can detract from the vehicle's overall appearance. Also, compact automobiles are often parked next to taller SUVs and trucks and this size mismatch also makes impacts more likely.

While many arrangements have been proposed for protecting the vehicle's exterior, these often involve an extendable device that is visible even when stored in a retracted position. Other devices sought to stow the protective mechanism out of sight under the vehicle, but these arrangements have employed long articulated arms that can easily bend upon impact and therefore offer little protection.

In U.S. Pat. No. 4,221,410 hydraulic cylinders mounted under a car can extend a bumper 14 sidewardly. Thereafter bumper 14 can be raised and supported on arms 13 and 13'.

In U.S. Pat. No. 4,648,644 arm 22 can extend and rotate due to a camming action that lifts arm 24 in order to raise and telescopically expand guard member 16. See also U.S. Pat. No. 4,437,697.

In U.S. Pat. No. 5,518,283 a pair of arms pivotally mounted in a vehicle's wheel wells can rotate a protective guard from under the vehicle to a position alongside the vehicle's doors, in response to a radio-controlled motor.

U.S. Pat. No. 3,677,595 discloses a normally exposed bumper protection bar 7 seated in a pocket or recess in the bumper. When the brake pedal is pressed hard hydraulic cylinders 9 extend bar 7 beyond the bumper In U.S. Pat. No. 5,011,205 pneumatic pistons extend a bumper 1 either when a control switch is actuated or when a brake pedal is fully depressed.

In U.S. Pat. No. 3,934,912 bumpers are supported on hydraulic shock absorbers that can be regulated based on the weight of the vehicle's payload. See also U.S. Pat. No. 3,972,551.

In U.S. Pat. No. 4,815,777 a normally protruding trim guard is mounted in a recess in a side panel of a motor vehicle. Pneumatic pressure applied to the trim guard when the vehicle is parked expands the trim guard to provide added protection.

In U.S. Pat. No. 4,961,605 pneumatic pressure can swing a normally protruding portion of protective trim outwardly to provide added protection.

In U.S. Pat. No. 5,004,281 normally protruding door bumpers are extended either by an electric motor or by a spring that is free to operate when a latch is released in response to operation of the door lock button.

In U.S. Pat. No. 4,461,503 trim guard is pulled into a retracted position when the vehicle is running; otherwise a compression spring outwardly extends the guard.

In U.S. Pat. No. 4,234,222 a pair of arms may be extended from the side of a vehicle. A tape or wire is strung taut between the two arms to protect the side of the vehicle.

See also U.S. Pat. Nos. 6,189,941 and 6,550,844.

Accordingly, there is a need for an improved arrangement for protecting a vehicle's exterior.

SUMMARY OF THE INVENTION

In accordance with the illustrative embodiments demonstrating features and advantages of the present invention, there is provided apparatus for protecting a vehicle's exterior, which exterior has an opening. The apparatus includes a guard moveable between (a) a deployed position in front of the opening in the vehicle's exterior, and (b) a retracted position that does not obtrude on the appearance of the vehicle's exterior.

In accordance with another aspect of the invention a vehicle protection apparatus is provided for protecting a vehicle's exterior. The apparatus has a vehicle body that has an exterior with an opening. The apparatus also includes a guard moveable between (a) a deployed position in front of the opening in the vehicle's exterior, and (b) a retracted position that does not obtrude on the appearance of the vehicle's exterior.

In accordance with another aspect of the invention apparatus is provided for protecting a vehicle's exterior. The apparatus includes a support adapted for attachment to the vehicle. Also included is a guard mounted on the support to translate linearly and angularly. The guard is moveable on the support between (a) an upright position in front of a portion of the vehicle's exterior, and (b) a retracted, non-upright position under the vehicle that does not obtrude on the appearance of the vehicle's exterior.

By employing apparatus of the foregoing type, an improved vehicle protection system is achieved. For original equipment manufacturers, the system can employ a finished door mounted in an opening of the vehicle's exterior. The door can open to allow deployment of a guard that is in the form of a steel plate, cup or block covered by an elastomeric material such as plastic or rubber. The guard can be deployed by a linear actuator that is driven electrically, hydraulically, pneumatically, or by other means. The door can be hinged, biased closed, and designed to be pushed aside by the guard as it deploys. Alternatively, a mechanism can automatically open the door before the guard reaches the opening in the vehicle's body.

For aftermarket applications, an actuator can be mounted under the vehicle to support a flipper-like guard. The actuator can linearly translate the flipper while in a horizontal orientation to the front of the vehicle, and then rotate the guard to an upright position in order to protect the front of the vehicle.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein.

DETAILED DESCRIPTION OF THE PREFERRED EMBODIMENTS

Figure 1:
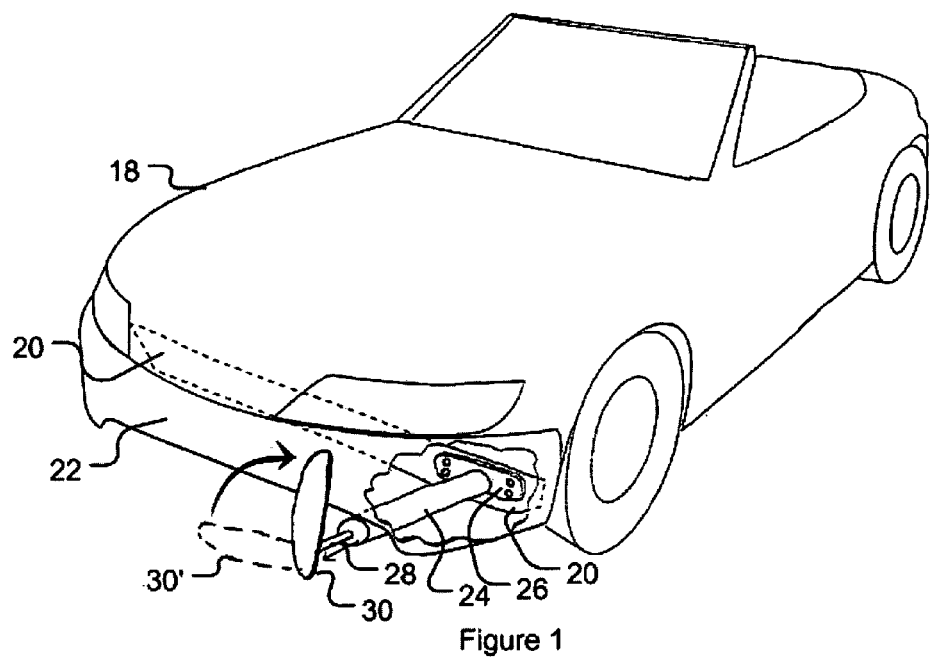
FIG. 1 is a perspective view of a vehicle with portions broken away in order to show a vehicle protection apparatus in accordance with principles of the present invention.

Referring to FIG. 1, a vehicle 18 has a frame member 20 located behind and at a lower elevation than the a vehicle bumper 22. The exterior of the body of vehicle 18 comprises the front of the vehicle including front bumper 22, the rear of the vehicle including the rear bumper (not shown), both sides of the vehicle, etc.

Apparatus for protecting the exterior of vehicle 18 is shown as a driver 24. Driver 24 is perpendicularly supported by a rectangular support plate 26 with rounded corners that is bolted onto frame member 20. Driver 24 operates as a support for drive rod 28, which can be driven to translate linearly and angularly. Because frame member 20 is at a relatively low elevation, drive rod 28 can pass below bumper 22. For vehicles lacking a low-lying frame member, an adapter plate (not shown) may be bolted to the vehicle's chassis to extend downwardly and provide a low-lying attachment surface for supporting driver 24. Alternatively, plate 26 can be dimensioned to support driver 24 at this lower elevation.

A guard 30 is perpendicularly attached to the distal end of the drive rod 28. Guard 30 may be a steel plate with rounded ends and may be covered with an elastomeric material made of plastic, rubber, or other pliant materials.

In this embodiment, driver 24 is an HSI hybrid dual motion motor manufactured by Haydon Switch & Instrument, Inc. of Waterbury, Conn. The latter type of motor can angularly translate guard 30 by rotating drive rod 28 about its axis, so that guard 30 rotates from the deployed upright position (shown in full) 90° counterclockwise to the non-upright orientation 30', shown in phantom.

Once guard 30 rotates to the non-upright position, driver 24 can also retract drive rod 28 and guard 30 to a position behind and below bumper 22. Once in this retracted position, guard 30 does not sit in front of any portion of the exterior of vehicle 18 and therefore does not obtrude on the vehicle's exterior.

Figure 2:
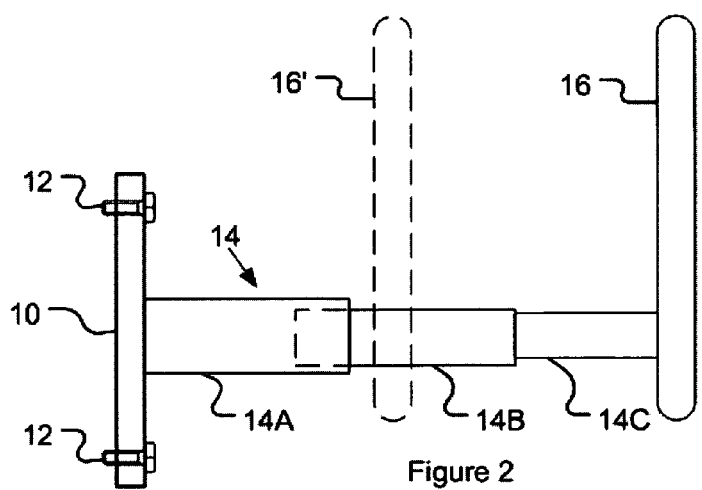
FIG. 2 is a plan view of a vehicle protection apparatus that is an alternate to that of FIG. 1.
Figure 4:
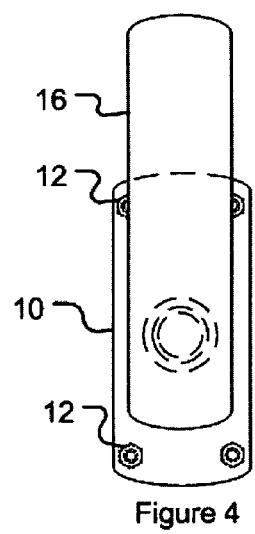
FIG. 4 is an end view of the apparatus of FIGS. 2 and 3.
Figure 3:
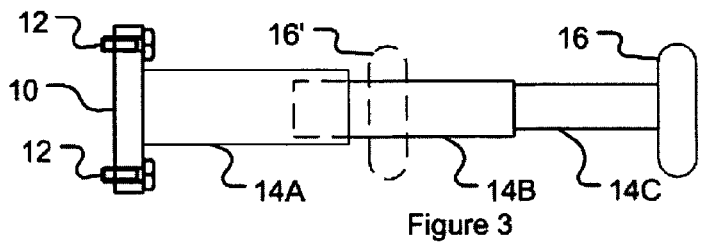
FIG. 3 is a side view of the apparatus of FIG. 2.

Referring to FIGS. 2–4, alternate apparatus is illustrated for protecting a vehicle's exterior. This apparatus can replace driver 24 and guard 30 of FIG. 1. The apparatus of FIGS. 2–4 has a rectangular support plate 10 with bolts 12 installed at each of its rounded corners for attachment to a vehicle chassis (for example, frame member 20 of FIG. 1). Perpendicularly attached to plate 10 is a driver 14 having three telescopically arranged components: base component 14A, intermediate sleeve 14B, and drive rod 14C.

A guard 16 is perpendicularly attached to the distal end of the drive rod 14C, which acts as a support. Guard 16 may be a steel plate with rounded ends and may be covered with an elastomeric material made of plastic, rubber, or other pliant materials.

Driver 14 can be a hydraulic or pneumatic piston arrangement, or an arrangement powered by an electrical solenoid, in order to extend the telescopic components 14B and 14C from the base component 14A, to the deployed position shown in full in FIGS. 1 and 2. Driver 14 can also be operated to retract guard 16 from the deployed position to the retracted position 16', shown in phantom in FIGS. 1 and 2. In some embodiments, drive rod 14C may be slidably mounted in a supporting mechanism that is not externally power and is instead manually moved between a deployed and a retracted position.

Figure 5:
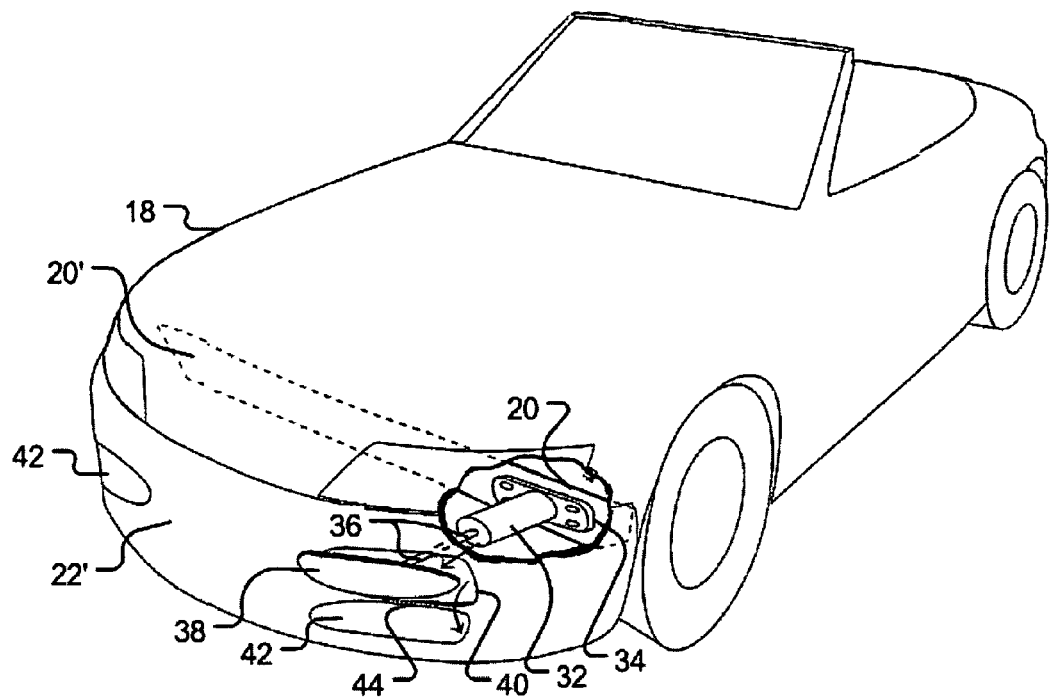
FIG. 5 is a perspective view of a vehicle similar to that shown in FIG. 1 but employing an alternate embodiment of the vehicle protection apparatus.

Referring to FIG. 5, vehicle 18 is substantially the same as the vehicle previously described in connection with FIG. 1, except for having a modified front bumper 22'. The vehicle 18 has a frame member 20' that is similar to the previously described frame member (frame member 20 of FIG. 1), except frame member 20' is at a higher elevation.

Driver 32 is perpendicularly attached to a rectangular plate 34 with rounded corners. Driver 24 is bolted through plate 34 onto frame member 20' at about the same elevation as bumper 22'. Driver 32 has a drive rod 36 that can reciprocate axially. Mounted perpendicularly on the distal end of drive rod 36 is a guard 38 that is identical to the guard previously described in FIG. 1.

In this embodiment driver 36 may be a non-rotating lead screw that is moved axially by a rotating threaded collar inside driver 32. Driver 32 may be in the form of a captive, hybrid linear actuator such as those manufactured by Haydon Switch & Instrument, Inc. of Waterbury, Conn. In other embodiments driver 32 may be powered by an electrical solenoid or a pneumatic or hydraulic cylinder.

The bumper 22' is fitted with right and left doors 42, the right one being closed and the left one being open (although normally both doors will open and close in unison). Since it is open, left door 42 exposes the opening 40 in bumper 22'. Door 42 is supported on a spring-biased hinge 44 from the lower edge of opening 40.

While door 42 is normally biased closed, driver 32 has deployed guard 38 through the opening 40 to push open door 42. In most embodiments guard 38 will be deployed by driver 32 about 1–12 inches (2.5–30.5 cm) in front of bumper 22'. When driver 32 retracts rod 36 and guard 38, spring biased door 42 will automatically close.

Because guard 38 is deployed at a reasonably high elevation, rotating guard 38 to an upright position is not essential, although in some embodiments driver 32 will in fact be designed to angularly translate the guard in a manner similar to that described in connection with FIG. 1.

Figure 6:
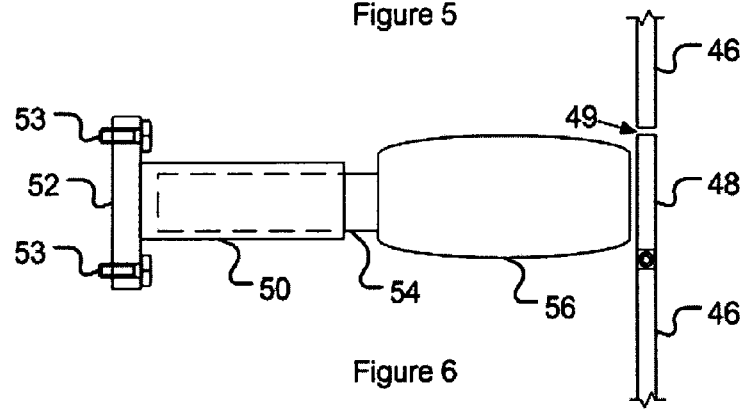
FIG. 6 is a plan view of still another embodiment of the vehicle protection apparatus.
Figure 7:
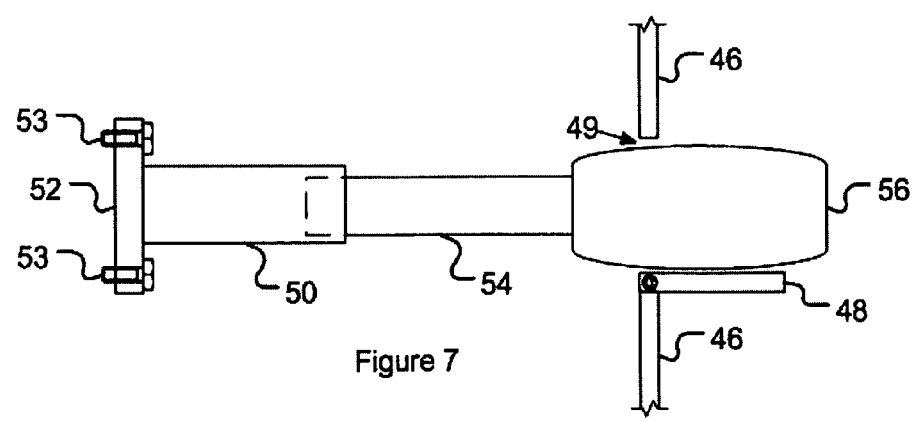
FIG. 7 is a plan view of the apparatus of FIG. 6 showing the guard in a deployed position.

Referring to FIGS. 6 and 7, the vehicle's exterior 46 (in this case, a rear side fender) is fitted with a hinged, spring-biased door 48 in opening 49. A driver 50 is shown as a cylindrical device mounted on a support plate 52, which may be attached to the vehicle's chassis by means of bolts 53. A tubular drive rod 54 is telescopically fitted into driver 50 and into guard 56. Guard 56 is a steel cup covered with a pliant material such as plastic or rubber.

In FIG. 6, guard 56 is shown in a retracted position behind closed door 48. In FIG. 7 pneumatic pressure applied to the cylindrical base of driver 50 is communicated through drive rod 54 to extend guard 56. Therefore, guard 56 pushes door 48 open and occupies an obtrusive position in front of the vehicle's exterior 46. When later, pressure in the cylindrical base of driver 50 is reversed, guard 56 is retracted to again take the unobtrusive, retracted position behind door 48, as shown in FIG. 6.

Figure 8:
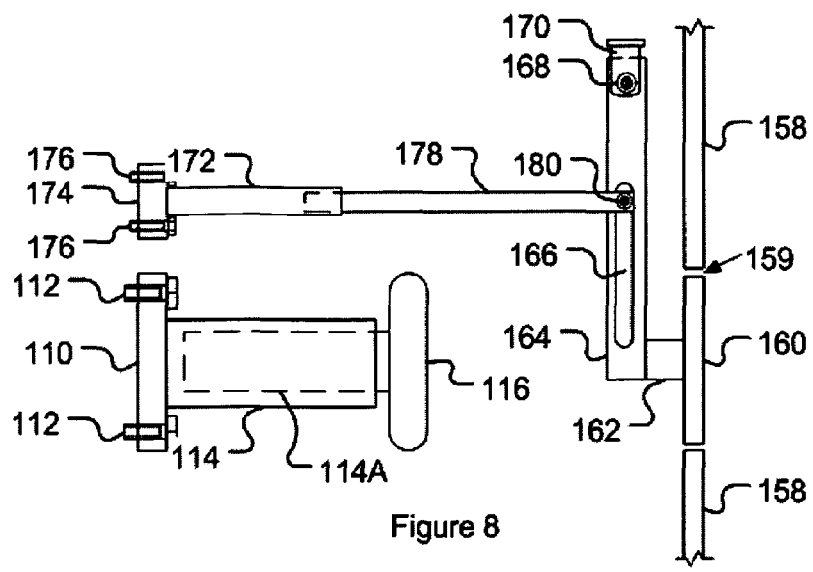
FIG. 8 is a plan view of yet another embodiment of the vehicle protection apparatus.
Figure 9:
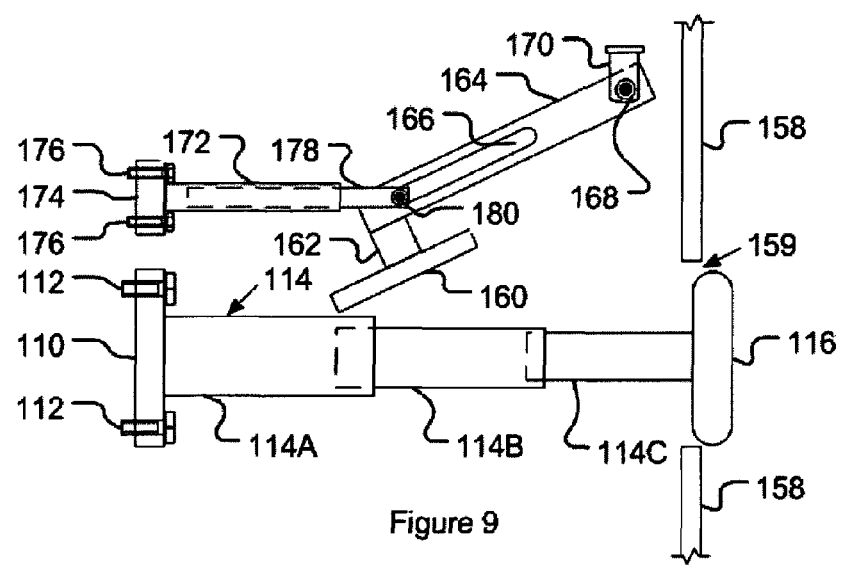
FIG. 9 is a plan view of the apparatus of FIG. 8 showing the guard in a deployed position.

Referring to FIGS. 8 and 9, components similar to those illustrated in FIGS. 2–4 bear the same reference numerals, but increased 100. In particular, driver 114 comprises three telescopically arranged components: base component 114A, intermediate sleeve 114B, and drive rod 114C. Driver 114 is electrically operated in this embodiment. Support plate 110 has bolts 112 installed at each of its rounded corners for attaching driver 114 to a vehicle chassis. A guard 116 is perpendicularly attached to the distal end of the drive rod 114C, which rod acts as a support. Guard 116 is in this embodiment a steel disk covered with a pliant material, much like the other guards.

The illustrated apparatus is protecting the vehicle's exterior, specifically the rear bumper 158, which is shown with an opening 159. In FIG. 8 door 160 has closed opening 159. Door 160 is attached through block 162 to lever arm 164, which has a longitudinal slot 166. Arm 164 is pivotally attached through pivot 168 to support plate 170, which is connected to the vehicle chassis.

An actuator 172 is attached through support plate 174 to the vehicle chassis by means of bolts 176. The actuator 172 also has a drive rod 178 that can reciprocate telescopically in the actuator. In this embodiment actuator 172 is operated electrically. The distal end of drive rod 178 has a sliding pin 180 that slides within slot 166 and is held in place with an appropriate capturing device such as a cotter pin, bolt, etc. (not shown).

To facilitate an understanding of the principles associated with the foregoing apparatus, its operation will be briefly described in connection with the apparatus of FIGS. 8 and 9. It will be appreciated that the operation of the other embodiments will be similar, with the major differences centered on whether a door exists and if it exists, how the door is opened and closed. (Note, since the door operation has been already described for the other embodiments, further elaboration is unnecessary).

With the driver 114 and actuator 172 attached to the vehicle chassis, the non-protecting condition of FIG. 8 was achieved by operating driver 114 to retract guard 116 into the illustrated, unobtrusive, retracted position. Also, drive rod 178 of actuator 172 remains fully extended to keep lever 164 in the illustrated position so that door 160 resides in opening 159, coplanar with the vehicle's exterior 158.

When the vehicle is parked in a hazardous lot or protection is otherwise desired, the driver will want to deploy guard 116, which may be one of a plurality of guards that are designed to protect different sectors of the vehicle's exterior. In fact, the driver may wish to deploy guard 116 before parking the vehicle to provide protection during the parking process.

Figure 10:
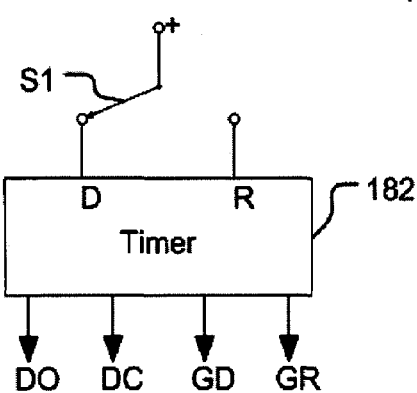
FIG. 10 is a schematic diagram of a timer used to sequence the apparatus of FIGS. 8 and 9.

Accordingly, the driver will operate electrical switch S1 (FIG. 10) located inside the passenger compartment by moving the switch's wiper to the position shown in FIG. 10 to supply power to terminal D of timer 182. Timer 182 then produces an output on terminal DO to operate actuator 172 (FIGS. 8 and 9) to draw rod 178 inwardly, thereby rotating lever 164 clockwise as pin 180 slides in slot 166. This rotation brings door 160 from the position shown in FIG. 8 to the position shown in FIG. 9.

Timer 182 then removes the control signal on terminal DO and applies a control signal on terminal GD (FIG. 10) to cause driver 114 to outwardly deploy guard 116. Consequently, telescopic elements 114B and 114C extend from base 114A to move the guard 116 from the retracted position of FIG. 8 to the deployed position of FIG. 9. Thereafter, timer 182 removes the control signal from terminal GD. It will be appreciated that other guards may be simultaneously deployed at the time guard 116 is deployed.

With guard 116 and other guards deployed the vehicle's exterior is now protected. Should another vehicle bump into the protected vehicle, guard 116 will obtrude and be impacted first.

When protection is no longer desired, the driver can throw the wiper of switch S1 to the other position (that is, the position complementary to the one illustrated in FIG. 10), so that power is supplied to terminal R of timer 182. In response, timer 182 applies a control signal to terminal GR to operate driver 114 and retract telescopic elements 114B and 114C. Therefore, guard 116 is moved from the deployed position of FIG. 9 to the retracted position of FIG. 8. Thereafter, timer 182 removes the signal from terminal GR and applies a control signal to terminal DC. In response, actuator 172 extends rod 178, causing lever 164 to rotate counterclockwise. Consequently, door 160 moves from the open position of FIG. 9 to the closed position of FIG. 8.

Significantly, door 160 as a high-quality finish matching the vehicle's exterior 158. Thus, the foregoing guard mechanism is hidden and unobtrusive so the vehicle will have a clean appearance and a fine finish.

It is appreciated that various modifications may be implemented with respect to the above described, preferred embodiment. The foregoing door is can be hinged along any edge, or can be mounted to slide in a direction parallel to the vehicle's exterior. Alternatively, the door can have two wings that are hinged on opposite sides and meet in the center. In addition, the door and the guard can have a variety is including shapes that are oval, circular, polygonal, etc. Moreover, the illustrated guards can be deployed various amounts depending upon the contours of the vehicle's exterior. In some embodiments the protected vehicle will have only one or two deployable guards, although other embodiments may have 3–8 deployable guards, which may be deployed simultaneously, in banks, or selectively depending upon the portions of the vehicle deemed vulnerable. The size, shape, and proportions of the various openings, guards and other components can be altered depending upon desired degree protection, available space, aesthetic considerations, etc.

Obviously, many modifications and variations of the present invention are possible in light of the above teachings. It is therefore to be understood that within the scope of the appended claims, the invention may be practiced otherwise than as specifically described.

The invention claimed is:

1. Apparatus for protecting a vehicle's exterior, the exterior having an opening, the apparatus comprising:
    a guard moveable between (a) a deployed position in front of the opening in the vehicle's exterior, and (b) a retracted position that does not obtrude on the appearance of the vehicles exterior; and
    a door having a closed position at said opening of the vehicle's exterior, and an open position.

2. Apparatus according to claim 1 wherein said door is finished to match the vehicle's exterior.

3. Apparatus according to claim 1 wherein said door is hinged.

4. Apparatus according to claim 1 wherein said door is hinged and biased to a closed position.

5. Apparatus according to claim 1 comprising:
    a lever arm supporting said door and operable to move said door between the open and the closed position.

6. Apparatus according to claim 5 comprising:
    an actuator adapted for mounting in said vehicle for rotating said lever arm.

7. Apparatus according to claim 1 wherein said door is adapted to be slidably mounted at said opening.

8. Apparatus according to claim 1 comprising:
a driver adapted for mounting in said vehicle and operable to move said guard between the deployed and the retracted position.

9. Apparatus according to claim 1 comprising:
a driver adapted for mounting in said vehicle and operable to move said guard between the deployed and the retracted position.

10. Apparatus according to claim 9 wherein said driver has a pair of telescopically arranged components.

11. Apparatus according to claim 1 comprising:
a drive rod adapted for mounting in said vehicle and for longitudinal reciprocation, said guard being transversely and distally mounted on said drive rod.

12. Apparatus according to claim 11 wherein said drive rod is adapted to rotate about its axis.

13. Apparatus according to claim 11 comprising:
a driver adapted for mounting in said vehicle and operable to (a) move said guard between the deployed and retracted position, and (b) rotate said guard to an upright orientation in the deployed position.

14. A vehicle protection apparatus for protecting a vehicle's exterior, comprising:
a vehicle body having an exterior with an opening;
a guard moveable between (a) a deployed position in front of the opening in the vehicle's exterior, and (b) a retracted position that does not obtrude on the appearance of the vehicle's exterior; and
a door having a closed position at said opening of the vehicle's exterior, and an open position.

15. Apparatus according to claim 14 wherein said door is finished to match the vehicle's exterior.

16. Apparatus according to claim 14 wherein said door is hinged.

17. Apparatus according to claim 14 wherein said door is adapted to be slidably mounted at said opening.

18. Apparatus according to claim 14 comprising:
a driver adapted for mounting in said vehicle and operable to move said guard between the deployed and the retracted position.

19. Apparatus according to claim 14 comprising:
a driver adapted for mounting in said vehicle and operable to move said guard between the deployed and the retracted position.

20. Apparatus for protecting a vehicle's exteriors comprising:
a support adapted for attachment to the vehicle; and
a guard mounted on said support to translate linearly and angularly, said guard being moveable on said support between (a) an upright position in front of a portion of the vehicle's exterior, and (b) a retracted, non-upright position under the vehicle that does not obtrude on the appearance of the vehicle's exterior.

21. Apparatus according to claim 20 comprising:
a driver adapted for mounting in said vehicle and operable to move said guard between the deployed and the retracted position.

22. Apparatus according to claim 21 wherein said driver has a pair of telescopically arranged components.

23. Apparatus according to claim 21 wherein said driver comprises:
a drive rod mounted for longitudinal reciprocation, said guard being transversely and distally mounted on said drive rod.

24. Apparatus according to claim 23 wherein said drive rod is adapted to rotate about its axis.

25. Apparatus according to claim 20 comprising:
a driver adapted for mounting in said vehicle and operable to (a) move said guard between the deployed and the retracted position, and (b) rotate said guard to an upright orientation in the deployed position.

* * * * *